No. 632,350. Patented Sept. 5, 1899.
G. HIMMEL.
INCANDESCENT BURNER.
(Application filed May 12, 1898.)

(No Model.) 2 Sheets—Sheet 1.

Witnesses
F. H. Schott
Anton A. Hoetzner

Inventor
Gottlob Himmel
by Max H. Srugii
Attorney

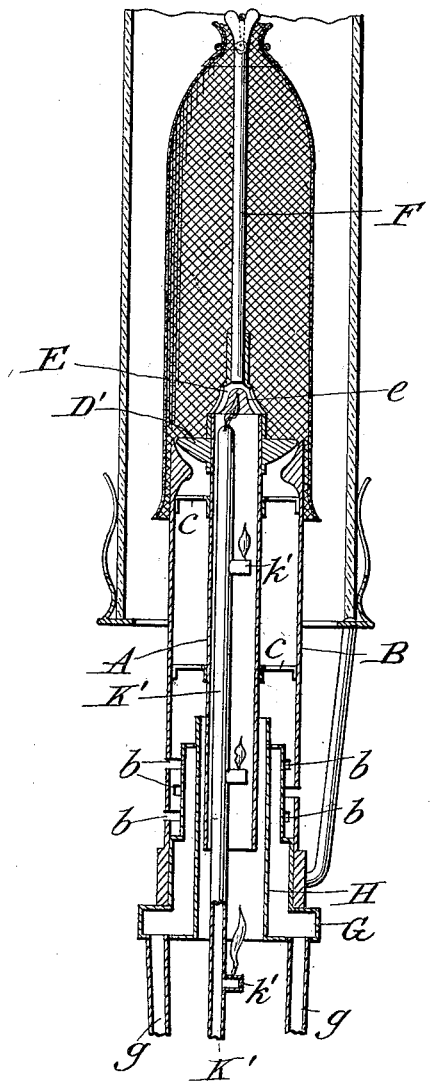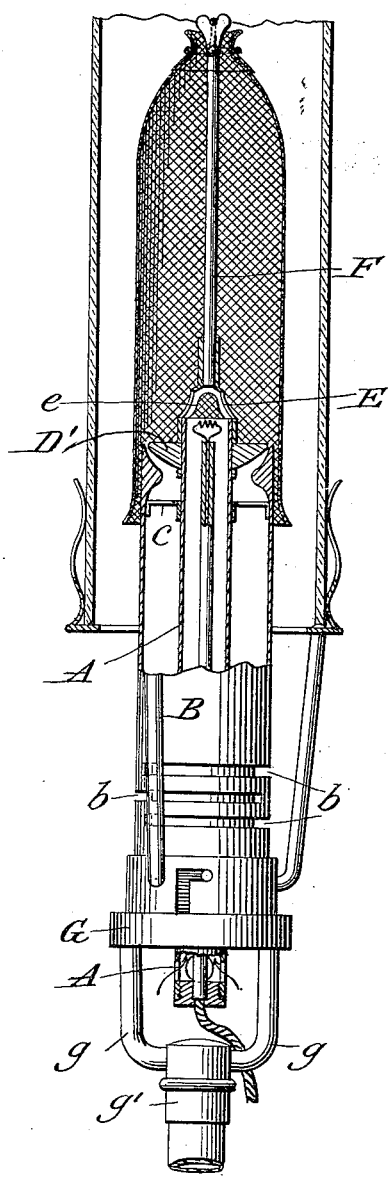

UNITED STATES PATENT OFFICE.

GOTTLOB HIMMEL, OF TUBINGEN, GERMANY.

INCANDESCENT BURNER.

SPECIFICATION forming part of Letters Patent No. 632,350, dated September 5, 1899.

Application filed May 12, 1898. Serial No. 680,465. (No model.)

*To all whom it may concern:*

Be it known that I, GOTTLOB HIMMEL, a citizen of the Empire of Germany, residing at Tubingen, in the Kingdom of Würtemberg, Germany, have invented certain new and useful Improvements in Incandescent Burners; and I do hereby declare the following to be a full, clear, and exact description of the invention, such as will enable others skilled in the art to which it appertains to make and use the same.

My invention relates to improvements in incandescent gas-lamps.

The object of my invention is to provide a gas-burner which will allow igniting devices to be employed without subjecting the said devices to heat sufficient to injure them, which will produce a most intimate mixture of the gas and air, thereby resulting in a quiet and noiseless burning of the same, and which will carry the mantle in an elastic manner, so as to reduce the danger of breakage from sudden shocks or jars.

With this object in view, my invention consists in the features, details of construction, and combinations of parts, which will first be described in connection with the accompanying drawings, and then particularly pointed out in the claims.

Figure 1:
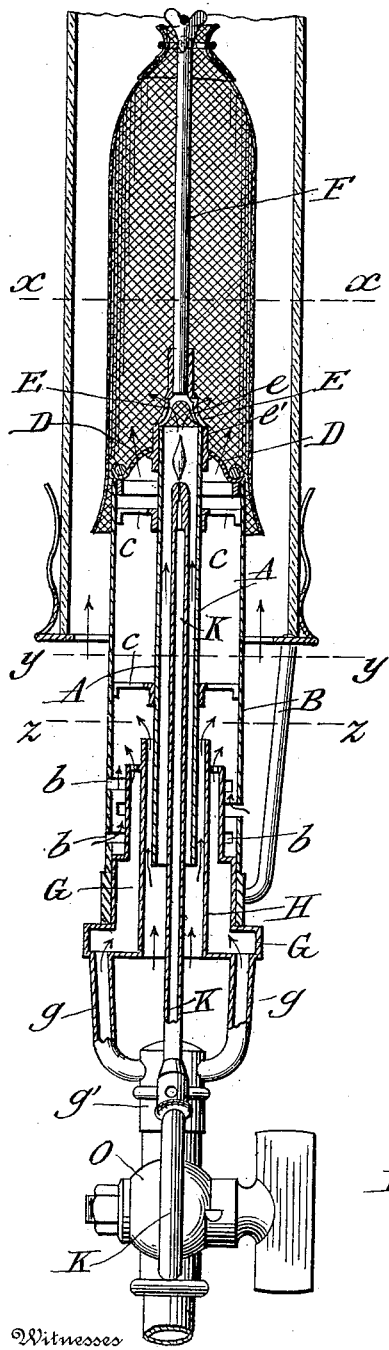
Figure 2:
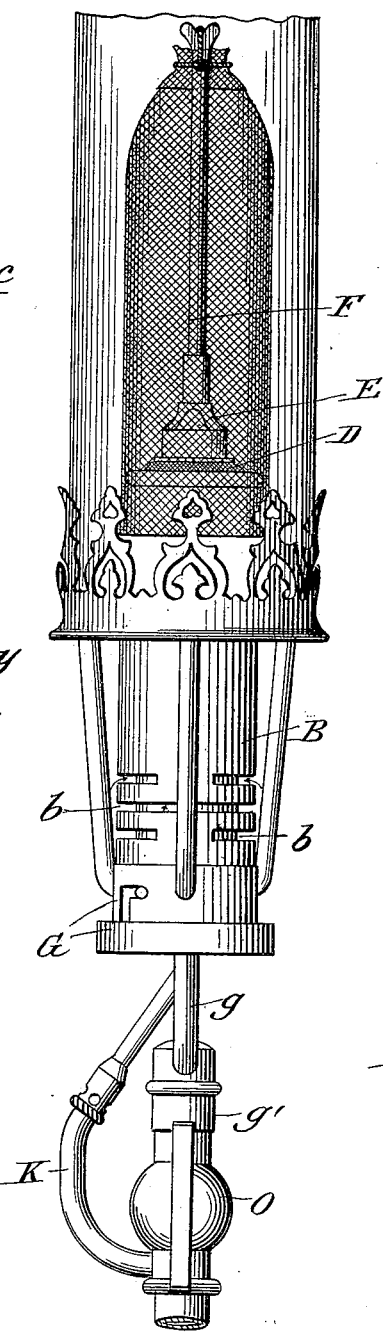
Figure 3:
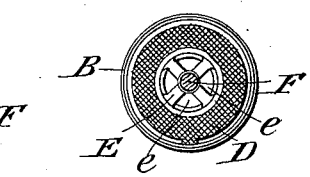
Figure 4:
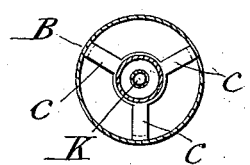
Figure 5:
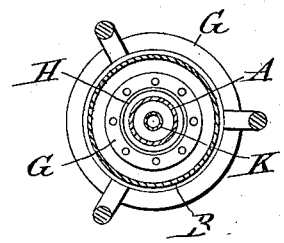

In the drawings, Figure 1 is a vertical central sectional view, partly in elevation, of one form of lamp embodying my invention. Fig. 2, an elevation of the same; Fig. 3, a section on the line $x$ $x$, Fig. 1; Fig. 4, a similar view on the line $y$ $y$, Fig. 1; and Fig. 5, a similar view on the line $z$ $z$, Fig. 1. Fig. 6 is a vertical central sectional view of another form of lamp embodying my invention; and Fig. 7 a similar view, partly in elevation, of still another form of lamp embodying my invention.

Referring to the drawings, B is a burner-tube within which is inclosed a pipe A, preferably centrally arranged, and whose interior forms what may be called a "cooling-chamber." The burner-tube B is detachably connected to a suitable supporting part—as, for example, to the gas-distributing box G—a bayonet-joint being shown in the drawings as the detachable means for securing the burner-tube in place. The gas-distributing box is suitably supported in turn from the gas-fixture, as by the branch gas-inlet pipes $g$, extending from a head $g'$, fixed on the end of a gas-supply cock O, by means of which the supply of gas to the burner may be turned on or off.

The gas-distributing box G is provided at its upper end with openings in order to permit the gas to enter the burner-tube B. These openings are located intermediate two sets of air-supplying openings. This is done, preferably, as follows: The upper end of the gas-distributing box G is contracted to form a nozzle having the openings for the escape of gas at the upper end. Furthermore, the said box G has an inner wall H, whereby a central passage-way is formed through the box G, the said wall H extending somewhat above the gas-escape openings in the nozzle. Into the upper end of the said central passage-way projects the lower end of the pipe A, the exterior diameter of the latter being less than the diameter of the central passage-way, whereby an annular space is left around the lower end of the pipe A, permitting communication between the said passage-way and the interior of the burner-tube. The lower end of the passage-way is open to the air, and the lower end of the pipe A is open to the passage-way. Moreover, the burner-tube is provided with air-inlets at a point below the gas-escape openings at the upper end of the gas-distributing box G. By this construction the gas flowing from the said openings at the upper end of the box G is met first by the air which enters the air-inlets in the burner-tube and then by the air which comes through the central passage-way around the lower end of the pipe A. Thus the gas enters the burner-tube between two currents of air, meeting first one and then the other, the gas and air traveling together through the burner-tube and thus mixing intimately before arriving at the point of ignition. Moreover, since the interior of the pipe A is in communication with the contact passage-way, a current of air will flow up the interior of said pipe A, thus keeping the said interior comparatively cool, for which reason I term it a "cooling-chamber," in which is to be located the desired igniting device, as will be more fully explained hereinafter. The pipe A is carried from the burner-tube by spiders c, secured to the inner surface of the burner-tube and to the outer surface of the said pipe A.

The upper end of the burner-tube in Fig. 1 carries a dome-shaped gauze or perforated plate D, through which the gas and air mixture passes to the point of ignition. The central portion of this plate D in Fig. 1 carries a collar e', into which the upper end of the pipe A fits loosely, the end of said pipe projecting slightly above the plate D, whereby the further advantages result that a slight additional amount of air is mixed with the gas and air mixture and an outward draft of the flame is produced, thus tending to keep cool the upper end of the pipe A and the parts directly above it and throwing the flame in close proximity to the interior of the incandescent mantle. The latter is hung from its upper ends upon a rod F, whose lower end is divided into branches E, resting upon and secured to the collar e', whereby openings e are formed between the said branches E, through which air may pass from the interior of the pipe A to the interior of the mantle.

In Figs. 6 and 7 the upper end of the interior of the burner-tube is provided with an annulus or ring over which is placed a deflecting-plate D', carried by the upper end of the pipe A. The air and gas mixture passes between the edge of the deflecting-plate D' and the annulus or ring into the interior of the mantle.

In order to elastically support the mantle so that it may not be damaged by sudden shocks or jars, I form the air-inlets b in the burner-tube B in the shape of slots extending partly around the burner-tube from opposite directions, whereby this slotted part of the burner-tube is made resilient, and thereby acts as a spring to prevent the sudden transmission to the mantle of any shocks received by the lower part of the lamp. Furthermore, in order to still further protect the mantle from accidental blows I support the chimney and its chimney-gallery rigidly—as, for instance, by fixing the gallery on rods secured at their lower ends to a suitable point—as, for example, to the burner-tube below the resilient portion. By this construction any accidental blows against the chimney cannot seriously affect the mantle.

As hereinbefore stated, the cooling-chamber formed in the interior of the pipe A is especially advantageous for receiving an igniting device, which is kept in a comparatively cool condition by means of the draft of air over it and which may be of any desired construction. For example, in Fig. 1 I have shown an igniting device formed by a bleeder-pipe K, which leads from the main gas-supply pipe beyond the cock O up into and through the cooling-chamber, the upper end of the said bleeder-pipe having a small outlet near the upper end of the pipe A. The gas escaping from this bleeder-pipe K is ignited on the initial lighting of the incandescent lamp, which may at that time be done as usual. After this initial lighting the lamp may be extinguished by turning off the cock without extinguishing the jet from the bleeder-pipe, which thereafter serves as a pilot-light. Consequently, to light the lamp it is then only necessary to turn on the gas at the cock O.

In Fig. 6 I have shown another form of igniting device consisting of a pipe K' with a series of lateral branches having jet-openings, one of said branches being below the burner, and thus readily accessible. The gas for this pipe K' is taken outside the cock, so that it is only turned on at the time of lighting the lamp, which may be done with this form of igniting device by applying a light to the lowest lateral jet, which upon igniting causes the ignition successively of all the jets above it and fully of the gas and air in the mantle.

In Fig. 7 an electric igniting device is shown, this consisting of a high resistance at the upper end of the pipe A, which may be heated to incandescence by an electric current from any suitable source carried to the high resistance through two conductors led up through a tube K² in the center of the cooling-chamber.

What I desire to secure by Letters Patent of the United States is—

1. In a lamp of the class described, the combination with a gas-distributing box having an inner wall forming an air-supplying passage-way, of a pipe connected with said passage-way and forming a cooling-chamber, and a burner-tube outside said pipe.

2. In a lamp of the class described, the combination, with a gas-distributing box having an inner wall forming an air-supplying passage-way, of a pipe connected with said passage-way and terminating at the ignition-point of the lamp, and a burner-tube outside said pipe.

3. In a lamp of the class described, the combination, with a gas-distributing box having an inner wall forming an air-supplying passage-way, of a pipe whose lower end enters the said passage-way and an igniting device located in the said pipe.

4. In a lamp of the class described, the combination with a gas-distributing box having gas-escape openings, and an inner wall forming a passage-way terminating above the gas-escape openings, of a pipe above the passage-way and opening above the ignition-point of the lamp, and a burner-tube outside the pipe and provided with air-inlets.

5. In a lamp of the class described, the combination, with a gas-distributing box, and gas-supplying branch pipes supporting the same, said distributing-box having gas-escape openings and an inner wall forming a passage-way, of a burner-tube outside the distributing-box and provided with air-inlets and a pipe above the passage-way for forming a cooling-chamber, and an igniting device in the cooling-chamber.

6. In a lamp of the class described, the combination, with a gas-distributing box, a burner-tube detachably connected therewith and provided with a resilient portion above its point of connection with the distributing-box, of a mantle supported by the burner-tube, a chimney-gallery, and a gallery-supporting device connected to the burner-tube below the resilient portion.

In testimony whereof I affix my signature in presence of two witnesses.

GOTTLOB HIMMEL.

Witnesses:
AUGUST DRAUTZ,
H. WAGNER.